United States Patent
Lash et al.

(10) Patent No.: US 6,728,605 B2
(45) Date of Patent: Apr. 27, 2004

(54) VEHICLE SPEED MONITORING SYSTEM AND METHOD

(75) Inventors: David M. C. Lash, Toronto (CA); Anthony B. Lash, Toronto (CA)

(73) Assignee: Beacon Marine Security Limited, Toronto (CA)

( * ) Notice: Subject to any disclaimer, the term of this patent is extended or adjusted under 35 U.S.C. 154(b) by 0 days.

(21) Appl. No.: 10/145,805

(22) Filed: May 16, 2002

(65) Prior Publication Data

US 2002/0173881 A1 Nov. 21, 2002

Related U.S. Application Data

(60) Provisional application No. 60/290,985, filed on May 16, 2001.

(51) Int. Cl.⁷ ............................................. G06F 17/00
(52) U.S. Cl. ..................... 701/1; 701/51; 701/93; 477/34; 475/121; 475/169; 180/65.2; 340/438
(58) Field of Search ........................ 701/1, 93, 96, 701/51; 340/438, 905, 441, 936, 988, 901, 902; 477/15, 34, 91, 160, 175; 123/687, 352; 192/361; 475/121, 169, 177, 198; 180/170, 65.2, 65.3, 178

(56) References Cited

U.S. PATENT DOCUMENTS

| | | | |
|---|---|---|---|
| 5,430,652 A | * 7/1995 | Fujioka | ........................ 701/74 |
| 5,515,043 A | 5/1996 | Berard et al. | |
| 5,819,198 A | * 10/1998 | Peretz | ......................... 701/117 |
| 6,037,765 A | * 3/2000 | Sager et al. | ................. 324/166 |
| 6,163,277 A | 12/2000 | Gehlot | |
| 6,166,658 A | 12/2000 | Testa | |
| 6,213,401 B1 | 4/2001 | Brown | |
| 6,388,578 B1 | * 5/2002 | Fagan et al. | ................. 340/901 |
| 6,462,675 B1 | * 10/2002 | Humphrey et al. | ......... 340/905 |
| 6,515,596 B2 | * 2/2003 | Awada | ........................ 340/905 |
| 2002/0126023 A1 | * 9/2002 | Awada | ........................ 340/905 |
| 2003/0052797 A1 | * 3/2003 | Rock et al. | .................. 340/936 |

FOREIGN PATENT DOCUMENTS

| | | | | |
|---|---|---|---|---|
| CA | 2186790 | | 3/1998 | |
| JP | 411258324 A | * | 9/1999 | ............. G01S/5/14 |
| JP | 411281393 A | * | 10/1999 | ........... G01C/23/00 |
| JP | 02000225929 A | * | 8/2000 | ............. B60T/7/12 |

OTHER PUBLICATIONS

Total Satellite Control Over Your Car's Speed & Location Tested, Rense.com http://www.rense.com/general7/satt.htm.

* cited by examiner

*Primary Examiner*—Thomas G. Black
*Assistant Examiner*—Tuan C To
(74) *Attorney, Agent, or Firm*—Bereskin & Parr; Isis E. Caulder

(57) ABSTRACT

The present invention comprises a vehicle speed monitoring device which enables a driver to enter a speed tolerance profile that represents the driver's personal travel speed preferences and which alerts the driver when the vehicle speed falls outside the speed tolerance profile. Specifically, the speed tolerance profile consists of a number of speed tolerance ranges, each associated with a particular posted speed limit. As the vehicle travels through various map zones, the applicable posted speed limit is determined using a customized GPS map. The device determines the vehicle location, speed and the posted speed limit and then compares the vehicle speed using a running average to see whether vehicle speed is within the driver's speed tolerance profile and if not, the device provides the driver with a visual and/or audible warning according to the driver's operational preferences.

17 Claims, 10 Drawing Sheets

VEHICLE SPEED MONITORING SYSTEM AND METHOD

This application claims priority from U.S. Provisional Patent Application No. 60/290,985 filed May 16, 2001.

FIELD OF THE INVENTION

The present invention pertains to a speed limit monitoring system for vehicles, and more particularly to a speed limit monitoring system which reflects the speed tolerance profile of a driver.

BACKGROUND OF THE INVENTION

Most roadways have a posted speed limit. However, posted speed limits are often ignored by a large number of drivers. These speeding drivers often drive recklessly at a speed well over the posted speed limit and are the cause of an appreciable number of road accidents. While the use of speed limit detecting systems is known in the prior art, most prior art speed limit detecting systems are not particularly practical or attractive to drivers and accordingly are not adopted or utilized.

U.S. Pat. No. 6,213,401 to Brown discloses a speed limit detecting system for detecting and displaying to a driver the speed limit on the roadway the driver is travelling on. The system includes bar coding indicia that is displayed on a road sign. The bar coding indicia graphically indicates predetermined information of the speed limit displayed on the road sign. A scanner is provided in the driver's vehicle for scanning the bar coding indicia and for displaying the predetermined information to the driver. However, this system is costly and impractical due to the requirement of modifying civic signs to feature bar code symbols and to maintain the signs such that dirt and other debris does not obscure the bar code symbols.

Canadian Patent Application No. 2,186,790 to McKenna discloses a device for calculating and signalling excess vehicular speed to the vehicle occupants. Specifically, a transmitter is located within certain roadway objects and a digital signal of the lawful maximum roadway speed limit is transmitted to an in-vehicle signal receiving component which in turn sends the posted maximum speed digital value to the an on-board device that compares vehicle speed with the posted speed limit and which issues an alarm when the vehicle exceeds the limit. However, this system is costly and impractical due to the requirement of modifying civic signs to contain transmitters.

Accordingly, there is a need for a vehicle speed monitoring system which takes personal speed limit tolerances preferences into consideration, which is relatively easy to implement within a roadway network and which is attractive to vehicle owners for vehicle operation.

SUMMARY OF THE INVENTION

The present invention provides a system for monitoring the speed of a vehicle in relation to a posted speed limit, said system comprising:
(a) a GPS receiver for determining the location and speed of the vehicle;
(b) an input device on which a driver may select a speed tolerance profile; and
(c) a processor coupled to said GPS receiver and said input device for determining the posted speed limit, said processor including a comparator for comparing the speed of the vehicle with the posted speed limit and generating a warning when the speed of the vehicle falls outside the speed tolerance profile.

In another aspect, the present invention is a method for monitoring the speed of a vehicle, said method comprising the steps of:
(a) determining the location and speed of the vehicle;
(b) allowing the driver to select a speed tolerance profile;
(c) determining the posted speed limit that corresponds to the location of the vehicle;
(d) comparing the speed of the vehicle with the posted speed limit; and
(e) generating a warning when the speed of the vehicle falls outside the speed tolerance profile.

Further objects and advantages of the invention will appear from the following description, taken together with the accompanying drawings.

BRIEF DESCRIPTION OF THE FIGURES

For a better understanding of the present invention, and to show more clearly how it may be carried into effect, reference will now be made by way of example to the accompanying drawings in which.

DETAILED DESCRIPTION OF THE PREFERRED EMBODIMENT

Figure 1:
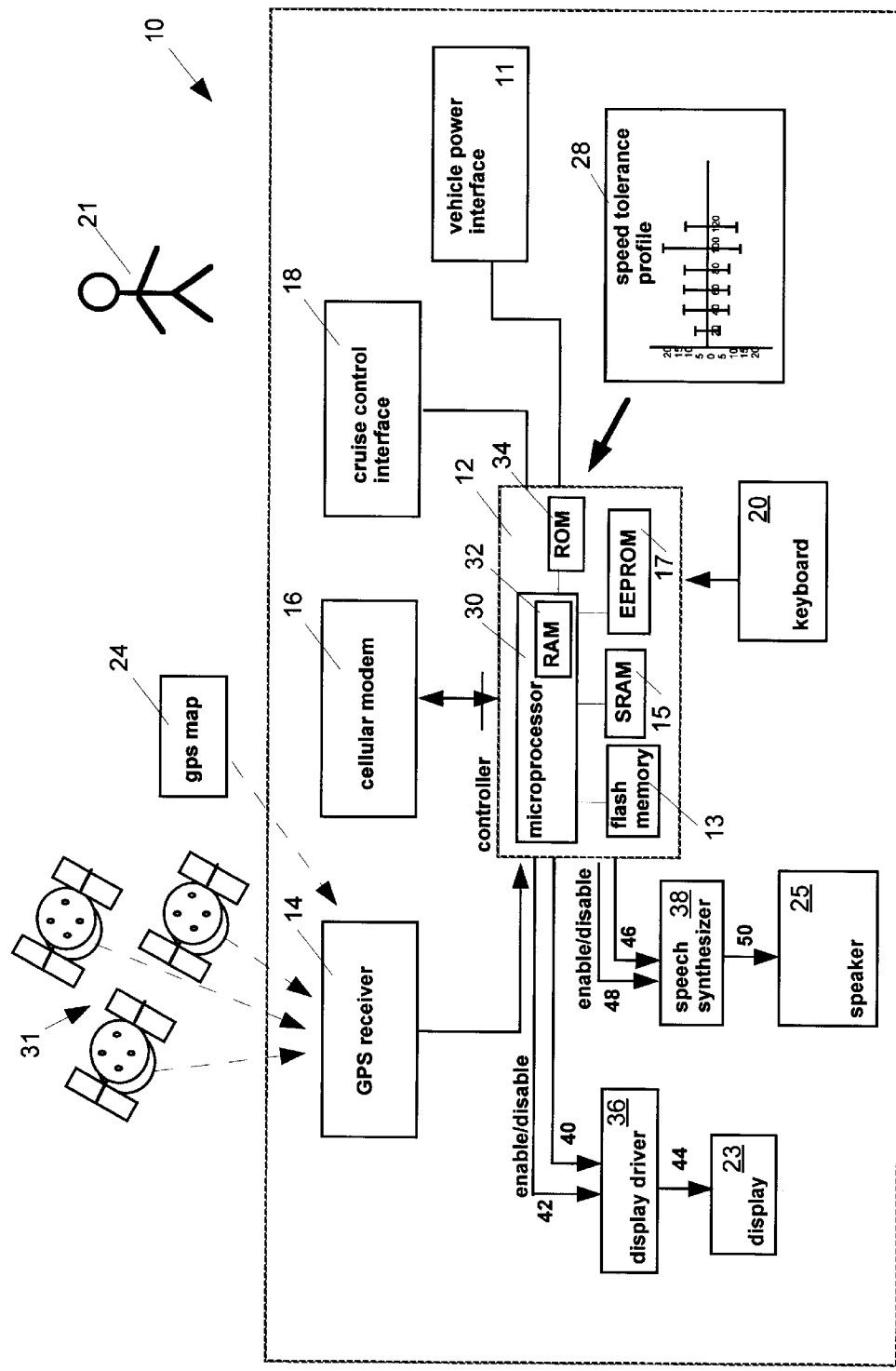
FIG. 1 is a front view of the faceplate of a preferred embodiment of the vehicle speed monitoring system of the present invention.

Reference is first made to FIG. 1, which shows a vehicle speed monitoring device 10 made in accordance with a preferred embodiment of the present invention. Vehicle speed monitoring device 10 includes a vehicle power interface 11, controller 12, a global positioning system (GPS) receiver 14, a cellular network modem 16, a cruise control interface 18, an input device 20, a display 23 and a speaker 25. Device 10 can be utilized by a driver 21 to monitor the speed of a vehicle within which device 10 is installed in relation to a posted speed limit as recorded on a conventional GPS map 24 and the driver's speed tolerance profile 28.

Controller 12 includes a microprocessor 30, which is preferably an Atmel Atmega 103 with 128 KB of flash memory 13, 4 KB of SRAM 15 and 4 KB of EEPROM 17. Microcontroller 30 has a maximum clock rate of 6 MHz and can be placed in low power sleep mode to conserve power when not operational. It should be understood that any other microcontroller may be utilized as long as it has sufficient memory and operational speed. Storage of program instructions and other static data is provided by a read only memory (ROM) 32, while storage of dynamic data is provided by a random access memory (RAM) 34. Both memory units 32 and 34 are controlled and accessed by controller 30 in a conventional manner. Specific logic is built into microprocessor 30 to provide speed monitoring system 10 with GPS and cellular transmission capability.

Vehicle power interface 11 is designed to interface with the electrical system of the vehicle and provides a five volt supply to controller 30, another five volt supply for any peripheral components attached to controller 12 and a 12 volt supply for cellular modem 16. Vehicle power interface 11 contains a battery backup to support the retention of the contents of RAM 32, in the event that speed monitoring system 10 is inadvertently unplugged from the vehicle.

Global positioning system (GPS) receiver 14 is used to receive conventional positioning data from a GPS satellite network 31. Regular and frequent GPS polling (e.g. once every second) by GPS receiver 14 enables controller 12 to determine the location, speed and direction of travel of the vehicle. Controller 12 also uses the location, speed and direction information received from GPS receiver 14 in association with GPS map 24 to determine when the vehicle has travelled into a geographical area with a different posted speed limit, as will be further described.

GPS receiver 14 can be any commercially available GPS unit such as that manufactured by Garmin International of Kansas, Motorola Inc. of Illinois and Magellan Corporation of California. GPS receiver 14 is typically designed to request any information that is supported by GPS network 31 and is programmed to receive such data routinely broadcasted by GPS network 31 as the latitude and longitude of the vehicle as well as the time of the position fix. It should be appreciated by one skilled in the art that other types of locating systems, such as LORAN-C or GLONASS, may perform the function of providing accurate position coordinates and may be substituted therefor. Hence, the present invention should not be construed as limited to the use of GPS satellite network 31 and the GPS receiver 14.

GPS map 24 is a conventional GPS map such as Mapsource: Roads & Recreation CD by Gamin and is stored in ROM 34 of controller 12. It is contemplated that GPS map 24 could also be downloaded through cellular modem 16 from the Internet and periodically updated to include latest speed limit information, local construction detours, etc. Driver 21 can select a GPS map 24 by entering the appropriate information on keyboard 20, and by specifying the start location and the desitnation with or without additional routing positions (e.g. Toronto to Miami to get the most direct route; or Toronto, Detroit, Atlanta, Miami to get a personalized route). If no specific map is requested, the controller will select one that reflects the current vehicle location and update the display as the vehicle moves outside the map area. Driver 21 can alternatively select a map by specifying a "route or track name" in accordance with common GPS practice.

Cellular network modem 16 can be any commercially available cellular modem such as the CMM8600 model manufactured by Standard Communications Corporation. Cellular modem 16 is connected to controller 12 and to an antenna (not shown). Controller 30 communicates with cellular modem 16 via an asynchronous serial interface. To conserve power, cellular modem 16 is usually shut down or placed in sleep mode. It should be understood that if the vehicle has a built in cellular phone, speed monitoring system 10 would be provided with a communication interface to couple controller 12 to the built in cellular phone port such that suitable communication would be established for transmission of data through the vehicle's cellular link.

Cruise control interface 18 is used by speed monitoring system 10 to access the functionality and the features of a typical cruise control unit for speed adjustment. Influencing the performance of a cruise control system by means of an electronic control unit (ECU) is commonplace. Following normal practices and acting as an ECU, the controller 12 signals the cruise control system using command requests such as "System On", "Speed Resume", "Constant Speed", "Speed Down", "Speed Up" and "System Off". For example, if the cruise control option has been enabled, and the controller determines that the current speed of the vehicle is greater than the posted speed limit plus the positive tolerance value (vehicle spped+x), then the command request signal "Speed Down" is sent to the cruise control system. Normal cruise control features, such as the driver override capability by applying brakes or gas, apply at all times, as does the driver's ability to resume normal operation of the cruise control system after such application of brakes or gas. These functions would not be under the control of our unit.

Figure 2:
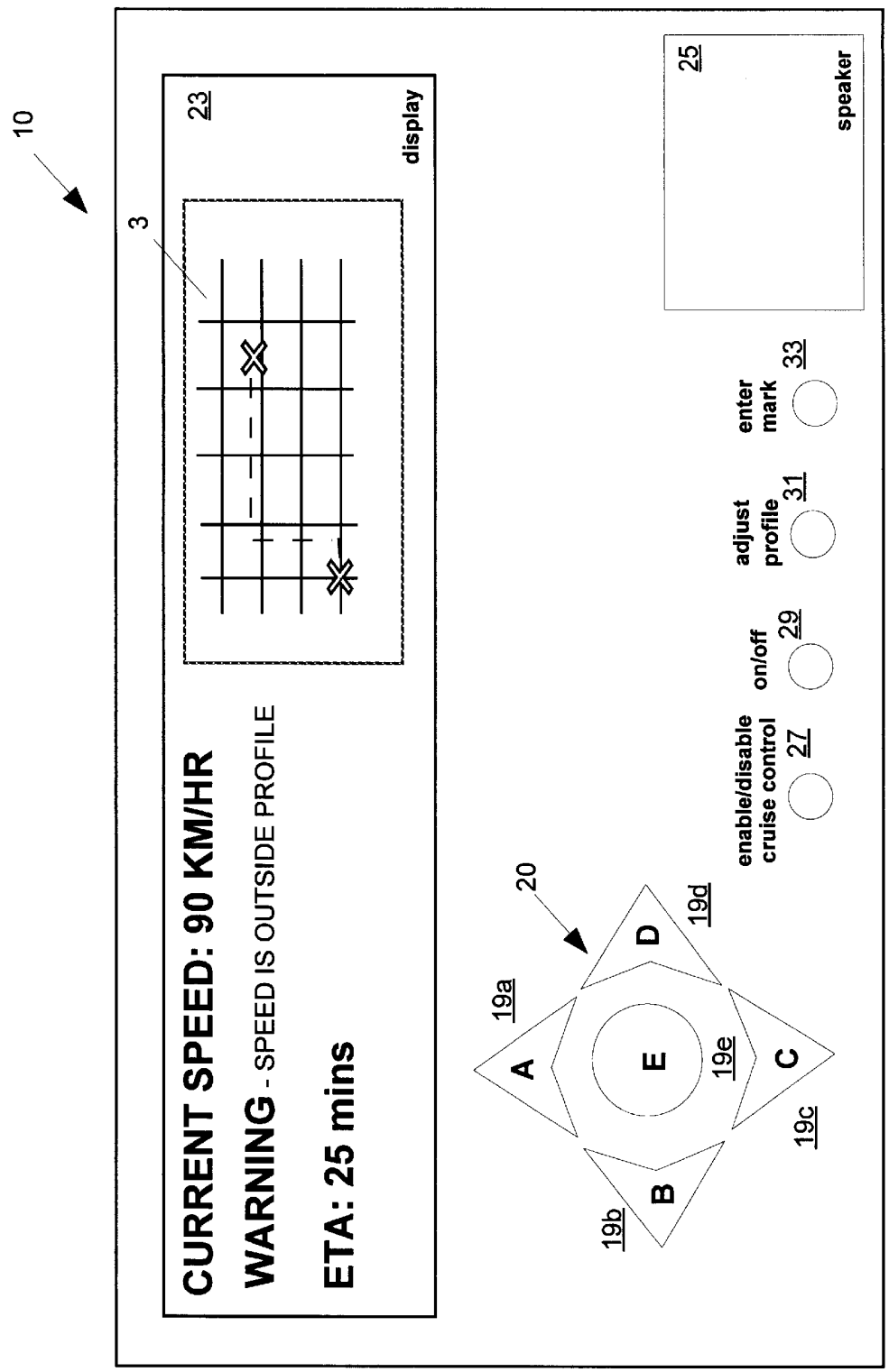
FIG. 2 is a more detailed schematic diagram of the vehicle speed monitoring system of FIG. 1.

Referring now to FIG. 1 and FIG. 2, where FIG. 2 shows the faceplate of speed monitoring system 10 as it would appear to a driver when speed monitoring system 10 is installed on the dashboard of the vehicle, input device 20 preferably consists of durable user keypad 18, on/off button 27, enable/disable cruise control button 29, adjust profile button 31, and enter mark button 33. User keypad 18, on/off button 27, enable/disable cruise control button 29, adjust profile button 31, and enter mark button 33 are designed to be easily identifiable and easily manipulated by the user (e.g. using sufficient button size and gripable surface texture). User keypad 18 includes a series of manual push buttons 19a, 19b, 19c, 19d, and 19e each of which are identified with a readable letter A to E. It should be understood that the manual push buttons could alternatively be marked with any set of symbols (e.g. numbers, digits, letters, etc.) and/or colors to simplify operation of device 10 by the user. The specific operation of input device 20 will be described in further detail in association with the specific functionality of speed monitoring system 10.

Display 23 and display driver 36 are utilized by speed monitoring system 10 to provide driver 21 with operational information as well as with visual warning when the vehicle speed falls outside the driver's speed tolerance profile 28. Display 23 may be any high resolution, full colour, daylight brightness, dot matrix display capable of displaying digits, letters and full graphics display. Display driver 36 may be any compatible commercially available driver that has the requisite drive capabilities for the selected display. When speed monitoring system 10 is operational, display 23 preferably displays the current speed of the vehicle in large "easy to read" format. When speed monitoring system 10 determines that the vehicle speed falls outside speed tolerance profile 28 for a particular posted speed limit.

Display 23 will also display an appropriate flashing message as shown in FIG. 2 such as "WARNING—TOO FAST". Also, display 23 will display an estimated time of arrival (ETA) which will take into account the number of miles (or kilometers) and the various speed zones between the current vehicle location and the distination. Both the current speed and projected speeds based on posted speed limits will be considered in such calculations.

Speaker 25 is designed to emit either a buzzer tone sound or a pre-recorded warning message with an adjustable sound pressure level having a sufficiently high decibel level so that the message will be clearly audible by driver 21 within the vehicle (i.e. audible over playing stereo or outside noise). Alternatively, speaker 25 does not have to be a separate system unit and can instead be the vehicle's existing speaker system and it should be understood that speed monitoring system 10 could be adapted so that speech synthesizer 38 is coupled to the vehicle's speaker system directly (i.e. through appropriate signal conditioning circuitry). In such a case, controller 12 could be programmed to interrupt other audio signals (e.g. radio or CD music signal) being provided to the vehicle's speaker system with an appropriate voice warning message.

Speaker 25 provides a voice warning message consisting of a few words having a calm tone (i.e. so as not to startle driver 21) such as "YOU MAY WANT TO SLOW DOWN", or "YOU ARE COMING UP TO A SLOWER SPEED ZONE—YOU MAY WANT TO SLOW DOWN" and would be generated by speech synthesizer 38 and transmitted through speaker 25. Further, the voice warning message can be emitted in one of several languages (e.g. English, French, Spanish) and can have a particular voice type (e.g. adult woman's voice, young boy's voice, etc.) all chosen by the user. Once activated by controller 12, the pre-recorded voice warning message is emitted once through speaker 25 and then preferably a continuing visual warning is provided to driver 21 through display 23 until driver 21 either disables warning or vehicle speed again falls within the driver's 21 speed tolerance profile 28, as will be further described.

Referring specifically back to FIG. 1, controller 12 is coupled to display driver 36 and speech synthesizer 38. Controller 12 is programmed to operate with display 23 to provide operational interaction with driver 21. Controller 12 can also activate the generation of a prerecorded voice warning message by enabling speech synthesizer 38 to generate a voice warning message which is then emitted through speaker 25. Controller 12 can activate display 23 by providing the appropriate control signal to display driver 36.

Specifically, controller 12 is coupled to display driver 36 through an information line 40 and an enable/disable line 42. Display driver 36 is connected to display 23 through information line 44. Information line 40 carries digital information signals generated by controller 12, which is intended for display on display 23 and enable/disable line 42 is used by controller 12 to control the on/off state of display 23. For example, information lines 40 could carry digital information corresponding to the current vehicle speed for display when device 10 is operational. In turn, display driver 36 would instruct display 23 through information line 40 to display the appropriate visual symbols that correspond to the digital information generated by controller 12.

Controller 12 is also coupled to speech synthesizer 38 which is in turn coupled to speaker 25. Controller 12 is connected to speech synthesizer 38 through an information line 46 and an enable/disable line 48. Controller 12 can enable or disable speech synthesizer 38 through enable/disable line 48. Information line 46 carries digital information signals containing instructions to speech synthesizer 38. The controller's instructions instruct speech synthesizer 38 to select and produce one of a number of pre-recorded voice warning messages such as the warning message "YOU SHOULD SLOW DOWN A BIT". In turn, speech synthesizer 38 would select and produce the appropriate voice warning message for transmission through speaker 25.

Speech synthesizer 38 may be implemented by the speech synthesizer circuit ISD 1000A by Tandy Corporation which includes an electrically erasable, programmable, read-only memory (EEPROM) for storing digitzed voice data. Such digital voice data may be stored in EEPROM by using the analog to digital converter (A/D converter) within the synthesizer. Such a digitized voice signal stored within speech synthesizer 38 can represent one of a plurality of voice warning messages so stored within the EEPROM memory of speech synthesizer 38.

Figure 3:
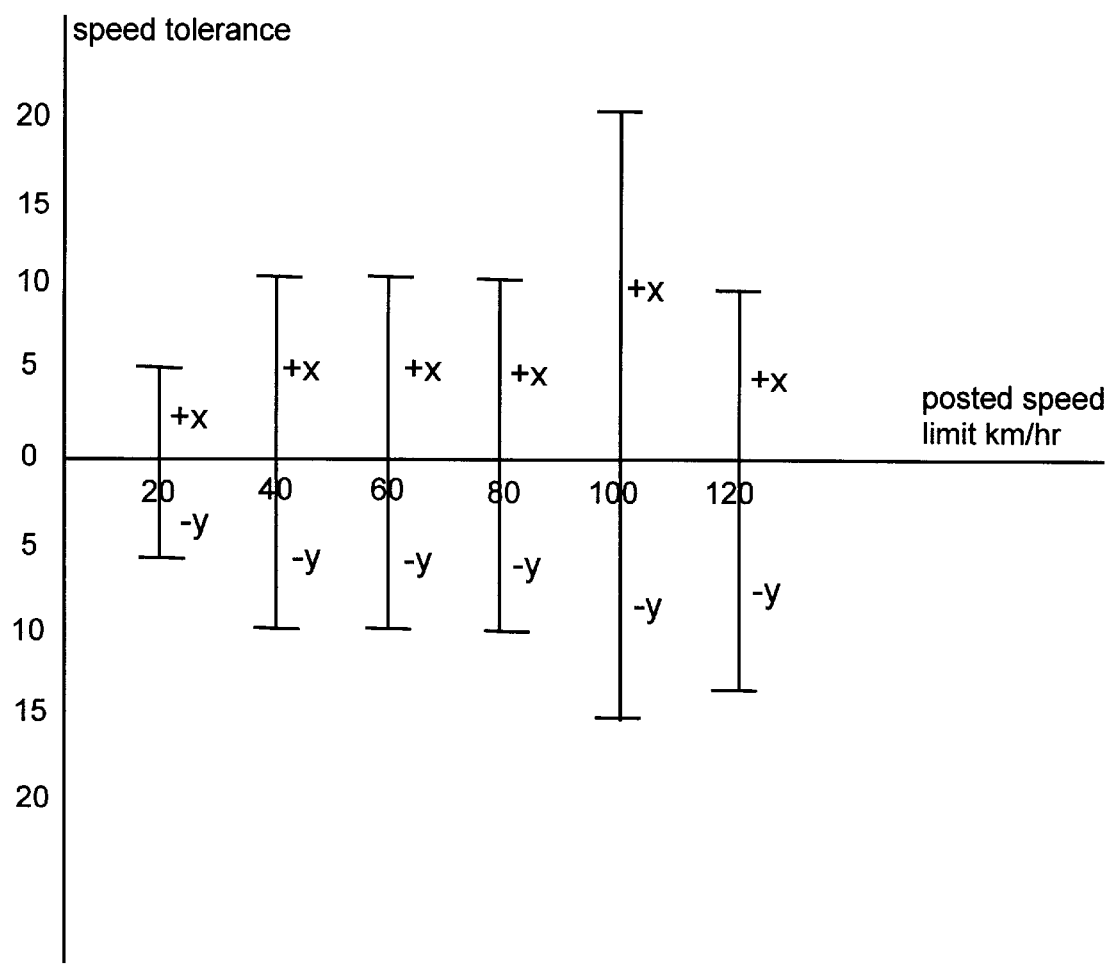
FIG. 3 is a graphical representation of a sample speed tolerance profile utilized by a vehicle speed monitoring system of FIG. 1.

FIG. 3 illustrates a typical driver speed tolerance profile 28 for a particular driver 21. As shown, the profile represents the various positive (i.e. represented as +x) and negative tolerances (i.e. represented as −y) at which driver 21 would be comfortable operating his car for a range of particular driving speeds (e.g. 20, 40, 60, 80, 100, 120 km/hr). As is routine, a driver may feel comfortable driving at a moderate speed in excess of a posted speed limit as long as he believes that law enforcement officials will not provide tickets for driving at such excess speed (e.g. +16 km/hr for a posted speed limit of 100 km/hr). A driver's own comfort level at lower speeds may be different (e.g. +/−5 km/hr when driving in an area with a posted speed limit of 20 km/hr).

Figure 4:
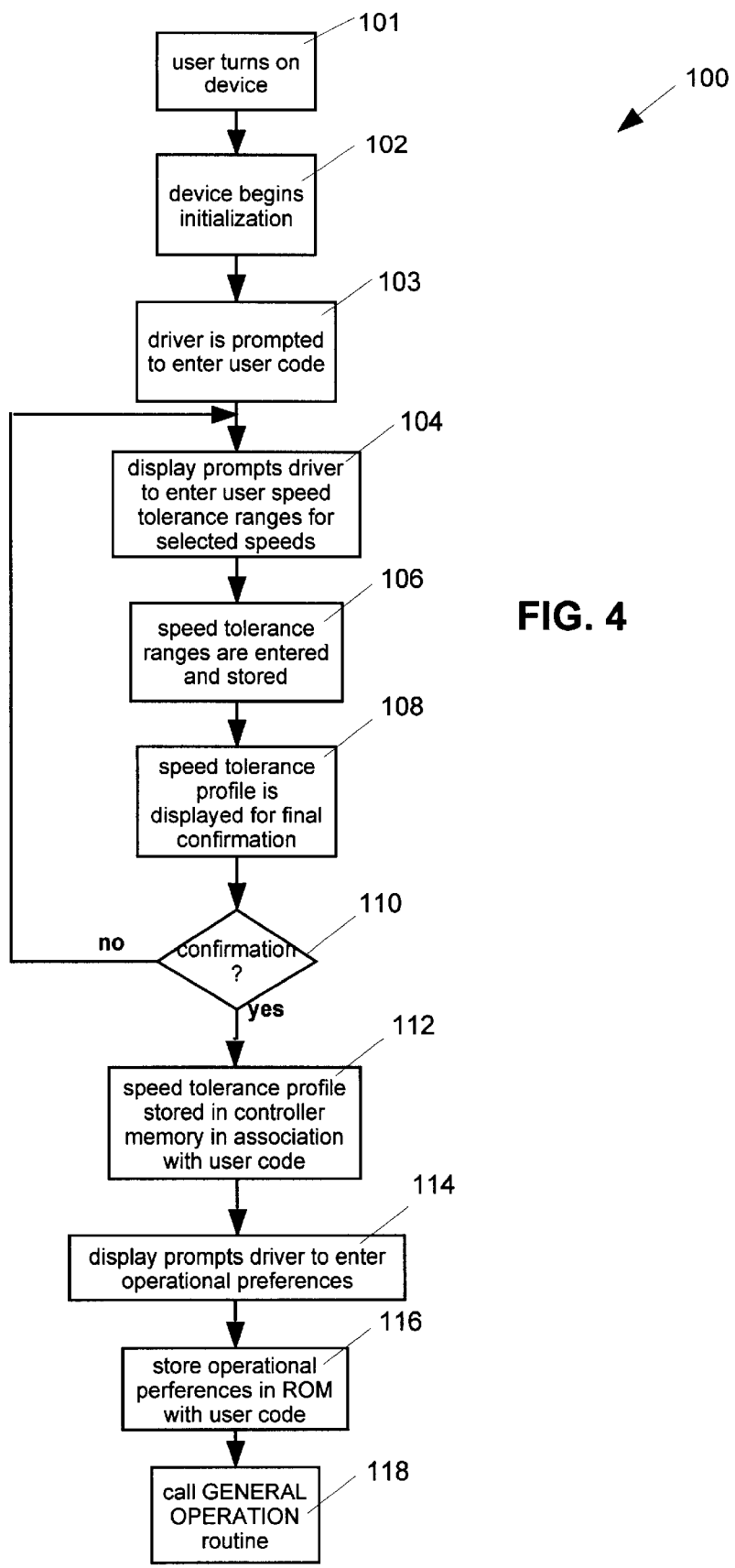
FIG. 4 is a flowchart showing the DRIVER CUSTOMIZATION routine for the vehicle speed monitoring system of FIG. 1.

Referring now to FIGS. 1, 2 and 4, a flowchart of the DRIVER CUSTOMIZATION routine 100 which is executed by controller 12 when driver 21 first customizes speed monitoring system 10 of FIG. 1 is specifically shown in FIG. 4.

At step (101), driver 21 presses on/off button 29 at which point initialization begins at step (102). At step (103), controller 12 instructs display driver 36 to drive display 23 to display a written message requesting driver 21 to input his user code which is then stored in ROM 34 for future use. The use of user codes allows more than one driver 21 to operate speed monitoring system 10 and to store unique speed tolerance profiles for use when driving), as will be described later At step (104) controller 12 instructs display driver 36 to drive display 23 to display a written message requesting driver 21 to input his speed tolerance profile into device 10 and a series of speeds such as those shown on the horizontal axis of FIG. 3 will be displayed by display 23 to the driver 21 alongside a message indicating that driver 21 should press UP or DOWN arrow keys (i.e. buttons 19a or 19c) to adjust his speed tolerance level for a particular posted speed limit and then to press ENTER (i.e. button 19e) when the correct speed tolerance levels have been chosen.

Once all of the upper and lower speed tolerance levels have been entered at step (106), controller 12 records driver's entries and stores them in RAM 32 (temporary memory) and displays speed tolerance profile data to driver 21 for final confirmation. At step (108) the speed tolerance profile is displayed to driver 21 and confirmation is requested. At step (110),controller 12 determines if driver 21 has accepted data. If not, then at step (104) driver 21 is again prompted for speed tolerance ranges for selected posted speed limits. If so, then at step (112), controller 12 stores the driver's speed tolerance profile 28 within ROM 34 (permanent memory).

At step (114), controller 12 instructs display driver 36 to drive display 23 to provide driver with a series of written instructions that prompts driver 21 to select operational preferences. For example, driver 21 will be instructed to enter his preferred message string type wherein display 23 provides the written instruction "MESSAGE FOR EXCEEDING RANGE AT A POSTED SPEED LIMIT? (A) SLOW DOWN!! (B) VEHICLE IS GOING TOO FAST!! (C) YOU'D BETTER SLOW DOWN (D) BUZZER SOUND ONLY (E) SCROLL FOR MORE OPTIONS". The driver will also be instructed to enter his preferred language choice for the prerecorded voice warning message wherein display 23 provides the written instruction "LANGUAGE? (A) ENGLISH (B) FRENCH (C) SPANISH (D) GERMAN (E) SCROLL FOR MORE OPTIONS". Driver 21 will also be prompted to enter his preferred voice type for the prerecorded warning message wherein display 23 features the written instruction "VOICE TYPE? (A) FEMALE ADULT (B) MALE ADULT (C) FEMALE TEEN (D) MALE TEEN".

Finally, driver 21 will be prompted to enter his preferred operational mode for device 10, namely whether he would like it to measure speeds in the units of miles per hour (mph) or kilometers per hous (kph). Accordingly, display 23 will display the written instruction "SPEED MEASURE: (A) MPH (B) KPH". Also, driver 21 will be asked whether he would like device to operate in full alarm mode (i.e. where spoken alarm or buzzer tone is activated as well as a flashing warning message on display) or silent mode (i.e. does not emit any audible alarm indication and only provides a flashing warning message). Accordingly, display 23 will display the written instruction "OPERATION MODE? (A) FULL ALARM MODE (B) SILENT MODE"". At step (116), the preferences selected by driver 21 are stored by controller 12 in ROM 34 for future use. At step (118), controller 12 calls the GENERAL OPERATIONAL routine.

As mentioned, it should be understood that controller 12 may be programmed to accept operational preferences (i.e. message, language, voice type, alarm type) for several drivers. Once driver 21 has gone through DRIVER CUSTOMIZATION routine, driver 21 can use device 10 by entering his user code after depressing the on/off button 29 on start up. Also, it should be understood that it would be possible to have each driver 21 enter biometric data to achieve secure access to device 10 and to ensure that the correct speed tolerance profile 28 is associated with each driver 21.

Figure 5:
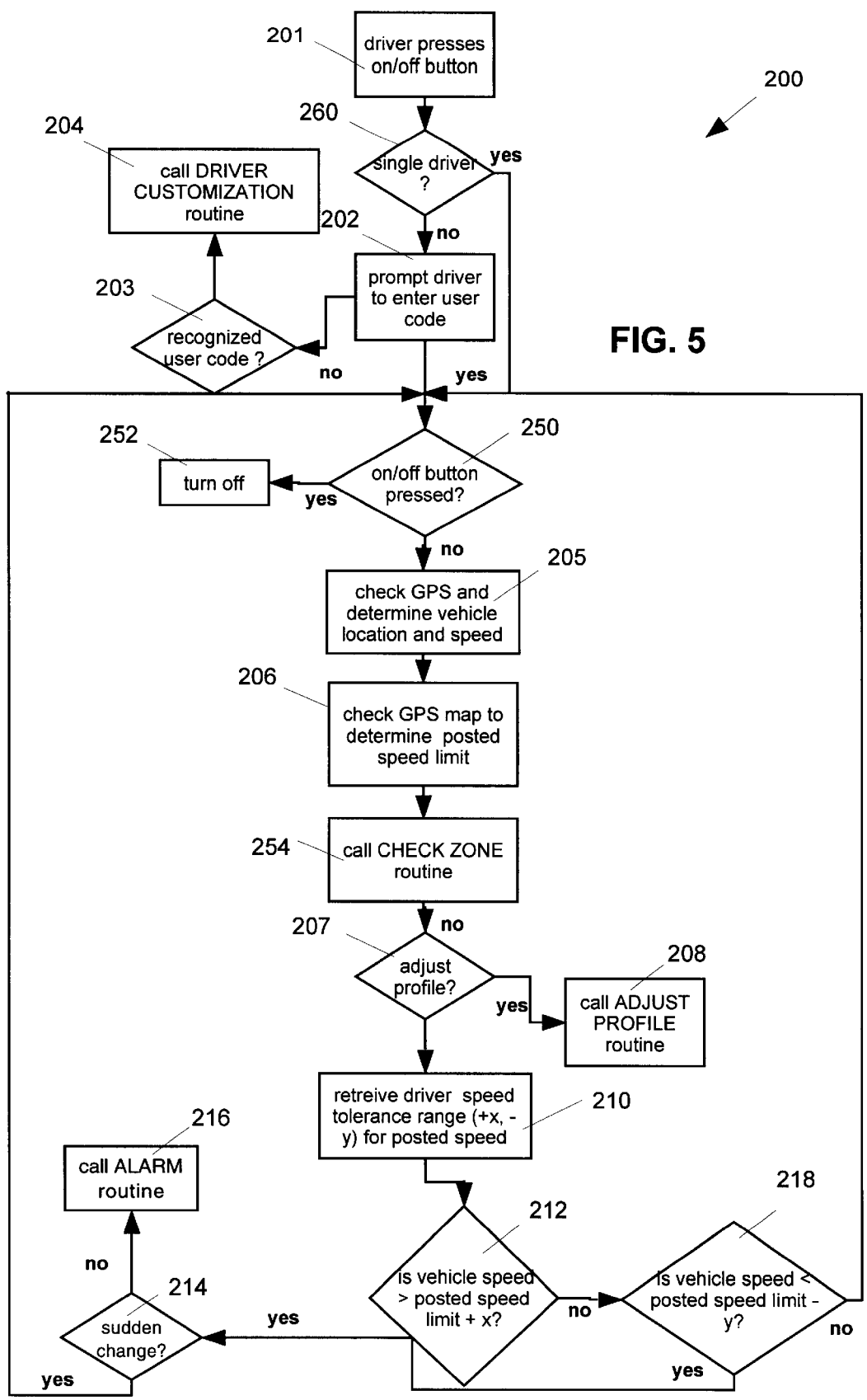
FIG. 5 is a flowchart showing the GENERAL OPERATION routine for the vehicle speed monitoring system of FIG. 1.

Referring now to FIGS. 1, 2 and 5, the GENERAL OPERATION routine 200 which is executed by controller 12 during general operation is illustrated specifically in FIG. 5. At step (201), the driver presses on/off button 26 and controller 12 instructs display driver 36 to illuminate display 23 and to provide a view of an appropriate excerpt of GPS map 24 including preferred route information as is conventionally known (as shown in FIG. 2 at 3). At step (260) controller 12 determines whether there is a single driver. If so then there is only one driver profile stored in ROM 23 and controller can simpy begin routine polling steps starting sith step (250) as described below. If there is more than one driver then at step (202), controller 12 prompts driver 21 to enter user code. At step (203) controller 12 determines whether there is existing user code in memory. If not, then at step (204) controller 12 calls the DRIVER CUSTOMIZATION routine 100 (FIG. 4) to obtain and store the speed tolerance profile 28 and the operational preferences of driver 21 in ROM 34.

If so, then controller 12 begins routine polling steps starting with step (250) where controller 12 determines if on/off button has been depressed again by driver 21. If so, then at step (252), device 10 is turned off. Otherwise, at step (205), controller 12 polls GPS receiver 14 to provide the location and speed of the vehicle. At step (206), controller 12 checks GPS map 28 (discussed above) and using the location of the vehicle determines the appropriate posted speed limit for the vehicle. At step (254), the CHECK ZONE routine 500 is executed, which allows device 10 to determine whether vehicle is entering a new posted speed limit zone and which allows driver 21 to select the operation of adjusting operational preferences as will be further described.

At step (207), controller determines whether driver 21 has requested to adjust speed tolerance profile 28 by polling to see whether driver 21 has depressed adjust profile button 31. If so, then at step (208), the ADJUST PROFILE routine 600 (see FIG. 9 as will be described) is called. If not, then at step (210) controller 12 retrieves the speed tolerance range that corresponds to the posted speed limit (i.e. the values +x and −y as discussed above for a particular speed limit as set by the driver in his profile).

At step (212), controller 12 checks if the speed of the vehicle is greater than the posted speed limit plus the positive tolerance value (i.e. vehicle speed+x). If so, then at step (214), controller 12 determines whether there has been a sudden change in speed of vehicle. This determination preferably consists of maintaining a running average of past speeds of the vehicle rate of change of speed (i.e. the derivative) to see whether it is below a certain threshold (i.e. changing slowly enough). This step is necessary to ensure that device 10 does not activate visual or audible warnings when it is not conventionally appropriate to do so (i.e. when there is a sudden braking of the vehicle or when the vehicle is sharply accelerated temporarily to pass vehicles on the road or to avoid a dangerous situation). That is, it is contemplated that the warnings provided by device 10 are most suitable when the vehicle is "creeping" upwards or downwards past what the driver 21 objectively deems to be acceptable speeds (i.e. as tracked within a driver's speed tolerance profile 28).

If controller 12 determines that there has not been a sudden change in speed of the vehicle (as discussed above), then at step (216) the ALARM routine 300 (illustrated in FIG. 6 as will be described) is called. If a sudden change of speed has been detected (i.e. when braking or speeding up temporarily to pass a vehicle up ahead or to avoid a dangerous situation) then at step (250), the above-noted routine steps are repeated (i.e. GPS receiver 14 is polled and location, speed of the vehicle is determined, and GPS map is consulted for posted speed limit, etc.)

If controller 12 determines that the vehicle speed is not greater than the posted speed limit plus the positive tolerance value (i.e. vehicle speed+x), then at step 218, controller 12 determines whether the vehicle speed is less than the posted speed limit minus the negative tolerance value (i.e. vehicle speed−y). If so, then at step 214 controller 12 executes a historical calculation to determine whether there has been a sudden change in speed of the vehicle, as discussed above and if not then ALARM routine is called at step 216. If so, then the general speed, location and posted speed limit polling steps are repeated as discussed above.

Figure 6:
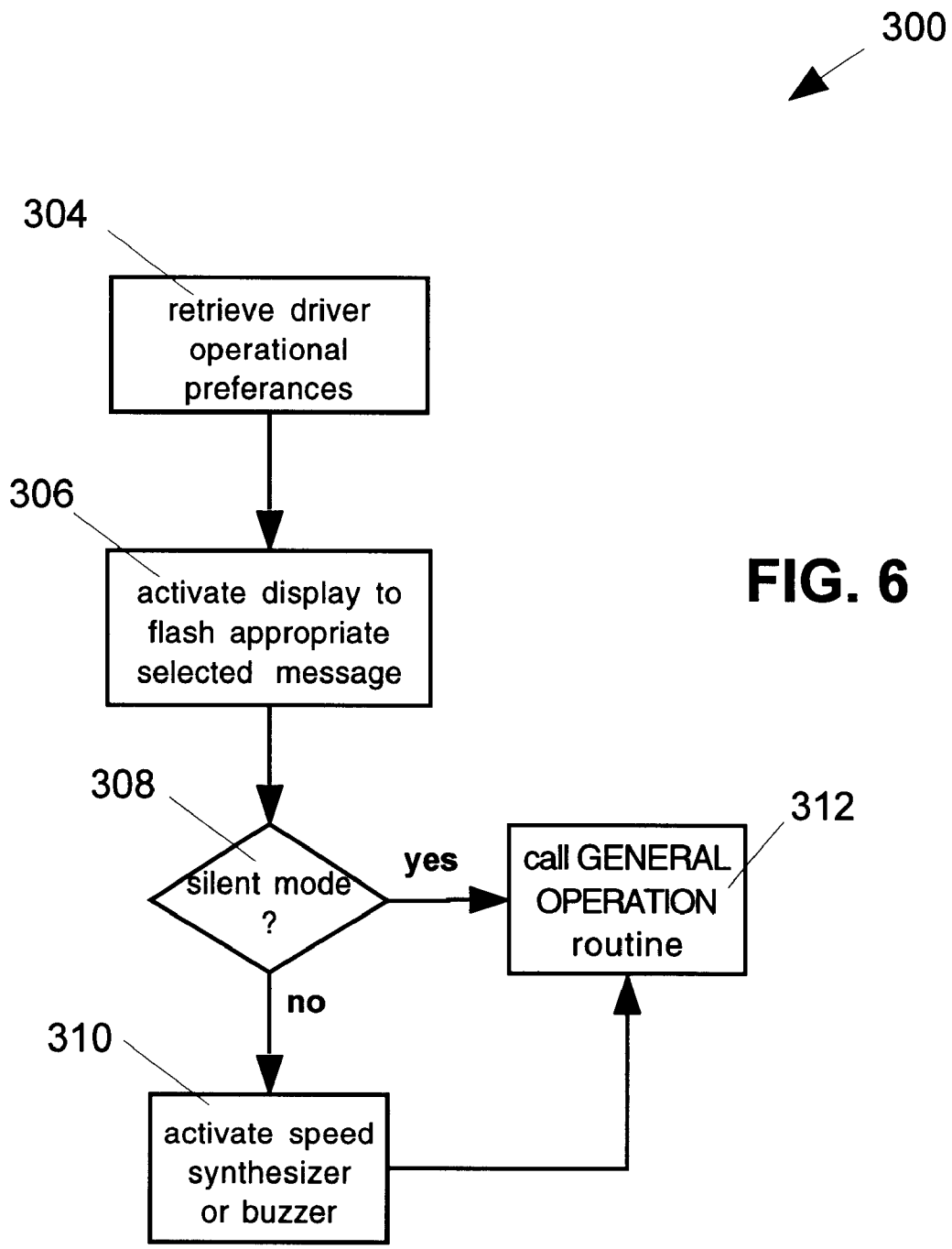
FIG. 6 is a flowchart showing the ALARM routine for the vehicle speed monitoring system of FIG. 1.

Referring now to FIGS. 1, 2 and 6, the ALARM routine 300 which is executed by controller 12 when an alarm warning is to be issued by device 10 is illustrated specifically in FIG. 6. This routine is called from the GENERAL OPERATION routine 200 when microcontroller 12 determines that alarm conditions have been met (i.e. vehicle speed has fallen outside the driver's speed tolerance profile 28).

At step (304) controller 12 retrieves the driver's operational preferences from ROM 34 (i.e. message type, language, and voice type also silent mode or not). At step (306), controller 12 instructs display driver 36 to cause display 23 to flash an appropriate message that corresponds to the particular posted speed limit, the vehicle speed and the driver's operational preferences, as discussed above. At step (308), controller 12 checks to see whether driver 21 has selected "silent mode" operation as discussed above (the regular full alarm mode is considered to be a default selection).

If the driver has not selected "silent mode" operation, then at step (310), controller 12 enables speech synthesizer 38 through enable/disable line 48 to generate a voice warning message according to the driver's operational preferences as stored in ROM 34 and which are provided through information line 46. If the driver has selected "silent mode" operation, then no audible warning alarm will be activated and at step (312) the GENERAL OPERATION routine 200 will be called.

As is conventionally known, a cruise control system (not shown) is connected to the electrical system of the vehicle and is enabled by a driver when a desired speed has been reached. From that point on, cruise control system receives a speed input signal from either a speedometer, wheel sensor or from some other suitable device and transmits an output signal to drive a fuel flow control for controlling fuel flow through a fuel pump to the engine. When the cruise control system receives an interrupt signal from a brake pedal, the cruise control system is interrupted and becomes inactive. Once the driver has ceased braking he or she may then input a resume signal to cruise control to cause the cruise control system to operate actively again to the setting that was previously entered and stored in memory.

Figure 7:
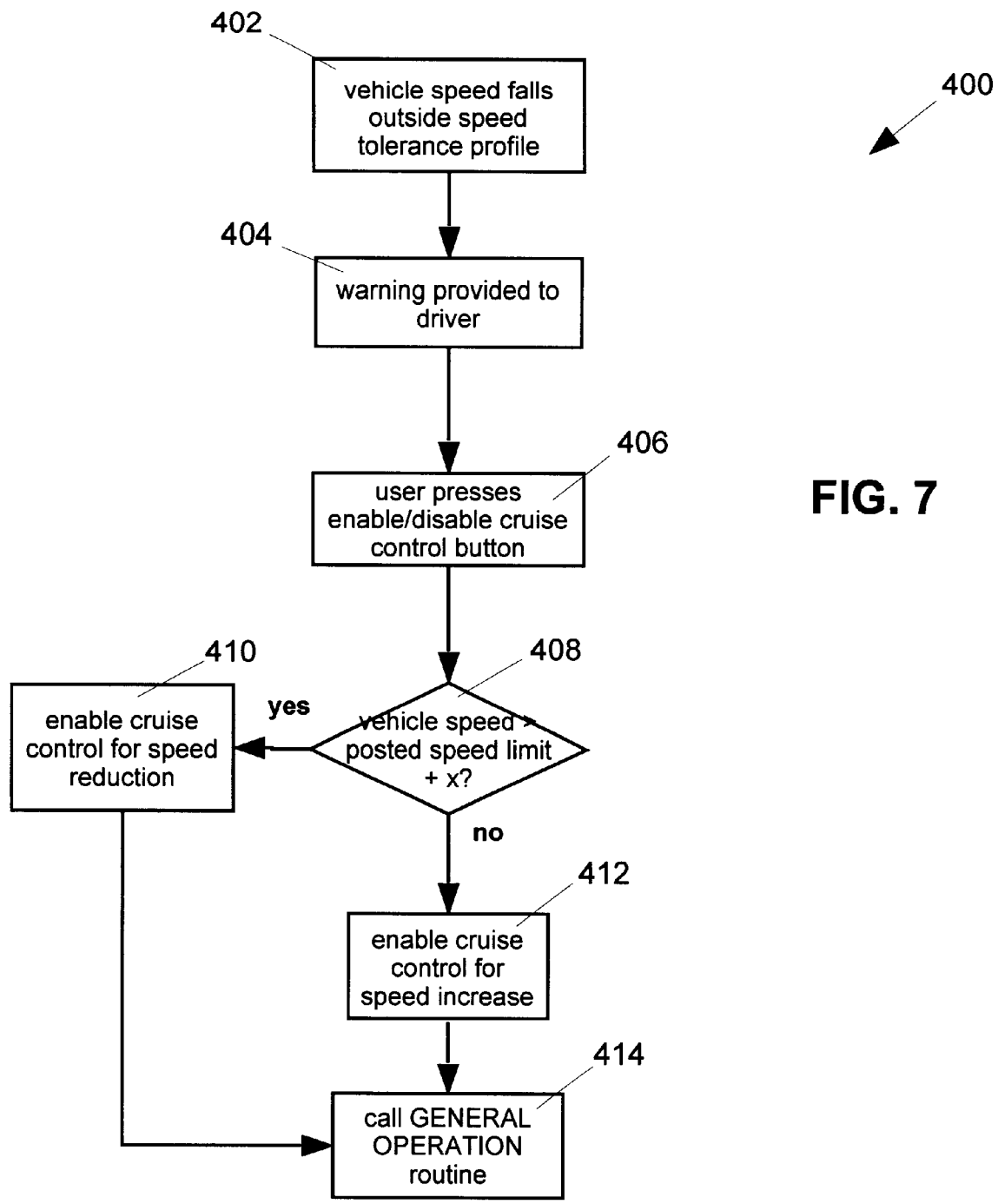
FIG. 7 is a flowchart showing the CRUISE CONTROL INTERFACE routine for the vehicle speed monitoring system of FIG. 1.

Referring now to FIGS. 1, 2 and 7, the CRUISE CONTROL routine 400 which is executed by controller 12 when the speed monitoring device 10 is utilized in association with a cruise control system is illustrated specifically in FIG. 7. It should be understood that speed monitoring device 10 can also be applied to the vehicle with or without a cruise control system.

Influencing the performance of a cruise control system by means of an electronic control unit (ECU) is commonplace. Following normal practices and acting as an ECU, the controller 12 signals the cruise control system using command requests such as "System On", "Speed Resume", "Constant Speed", "Speed Down", "Speed Up" and "System Off". For example, if the cruise control option has been enabled, and the controller determines that the current speed of the vehicle is greater than the posted speed limit plus the positive tolerance value (vehicle speed+x), then the command request signal "Speed Down" is sent to the cruise control system. Normal cruise control features, such as the driver override capability by applying brakes or gas, apply at all times, as does the driver's ability to resume normal operation of the cruise control system after such application of brakes or gas. These functions would not be under the control of device 10.

At step (402), the speed of the vehicle falls outside the driver's speed tolerance profile 28 and appropriate warning messages have been provided (i.e. using ALARM routine 300). At step (404), device 10 provides a warning to driver 21 and as a result at step (406), driver 21 presses the enable/disable cruise control button 27. Controller 12 then determines at step (408) whether the speed of the vehicle is greater than the posted speed limit for the location of the vehicle plus the positive tolerance (i.e. +x). If so, then at step (410), controller 12 enables cruise control for speed reduction of vehicle speed. If not, then vehicle is travelling at below what driver would like to and controller 12 enables cruise control for speed increase of vehicle speed. Finally, at step (412) the GENERAL OPERATION routine 200 is called.

Figure 8:
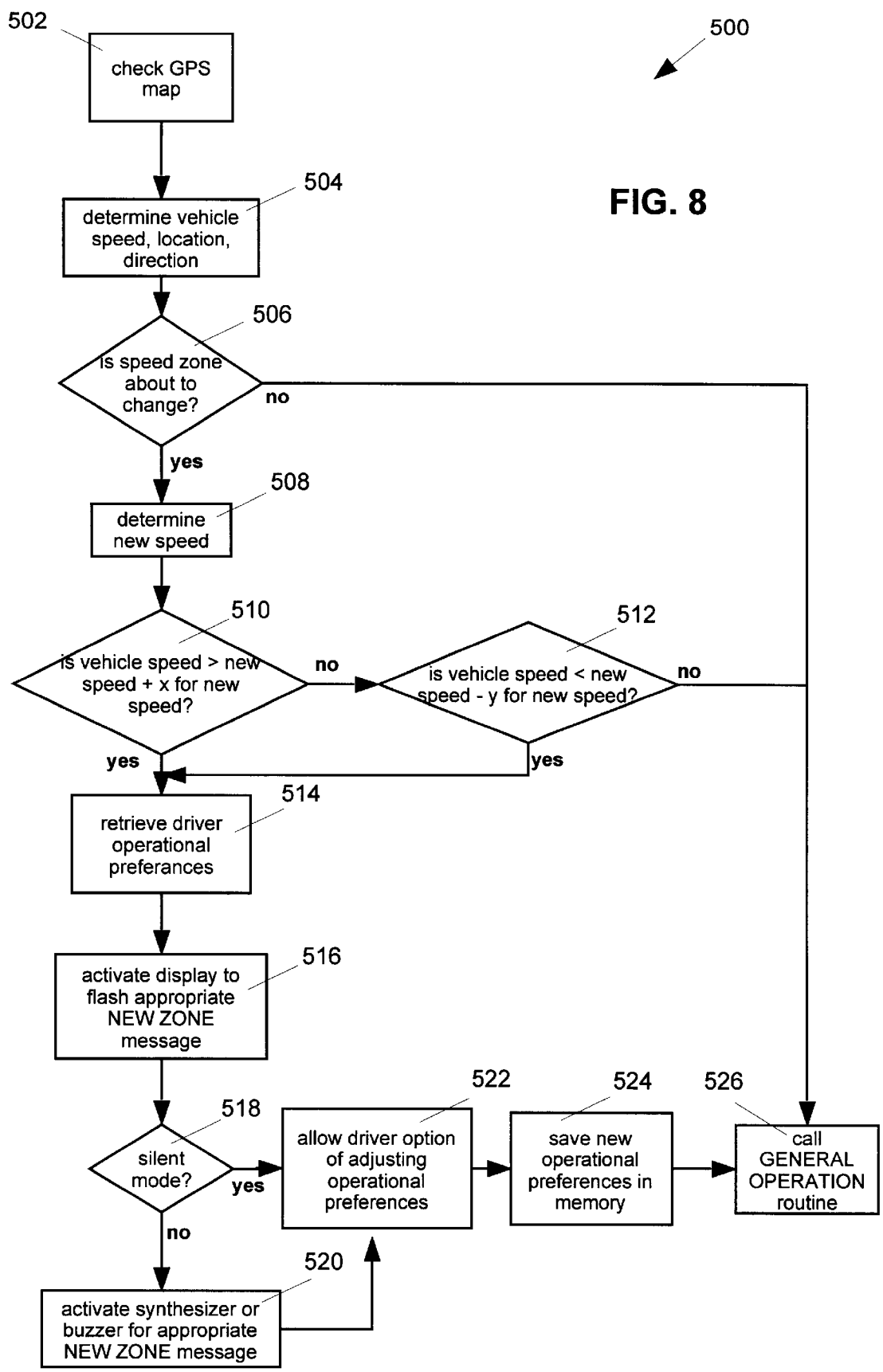
FIG. 8 is a flowchart showing the CHECK ZONE routine for the vehicle speed monitoring system of FIG. 1.

Referring now to FIGS. 1, 2 and 8, the CHECK ZONE routine 500 which is periodically executed by controller 12 during the GENERAL OPERATION routine 200 (as previously noted) is illustrated in FIG. 8. This routine is used by controller 12 to determine whether vehicle is entering a region on GPS map with a posted speed limit that is different than the region currently being traversed. As discussed before, it is contemplated that display 23 will display an estimated time of arrival (ETA) which will take into account the number of miles (or kilometers) and the various speed zones between the current vehicle location and the distination. Both the current speed and projected speeds based on posted speed limits will be considered in such calculations.

At step (502), controller 12 checks GPS map 24 and then at step (504) determines vehicle speed, location, and direction. At step (506), controller 12 compares location of vehicle and speed with the information contained in GPS map 24 and determines whether the speed zone is about to change (i.e. within the next 1 to 2 minutes at current driving speed). If not, then controller 12 returns to GENERAL OPERATION routine 200. If so, then at step (508), controller 12 determines the new speed for the upcoming zone and then at step (510) determines if the vehicle speed is greater than the new speed plus the driver's positive tolerance (i.e. x) for the new posted speed limit.

If not, then at step (512), controller 12 determines whether the vehicle speed is less than the new speed minus the driver's negative tolerance (i.e. y) for the new posted speed limit. If not, then controller 12 returns to GENERAL OPERATION routine 200.

If so, then at step (514), controller 12 retrieves driver operational preferences from ROM memory 34 and then at step (516) activates display 23 to flash an appropriate NEW ZONE message. At step (518), controller 12 determines whether driver 21 selected silent mode for warnings. If not, then controller 12 also activates speech synthesizer 38 to provide an audible speed warning such as "ENTERING NEW SPEED ZONE" If so, then the audible warning is not heard and then at step (522), controller 12 instructs display 23 to provide driver 21 with the option of adjusting operational preferences. Any new operational preferences are then stored in ROM memory 34 and the GENERAL OPERATION routine 200 is called at step (526).

Figure 9:
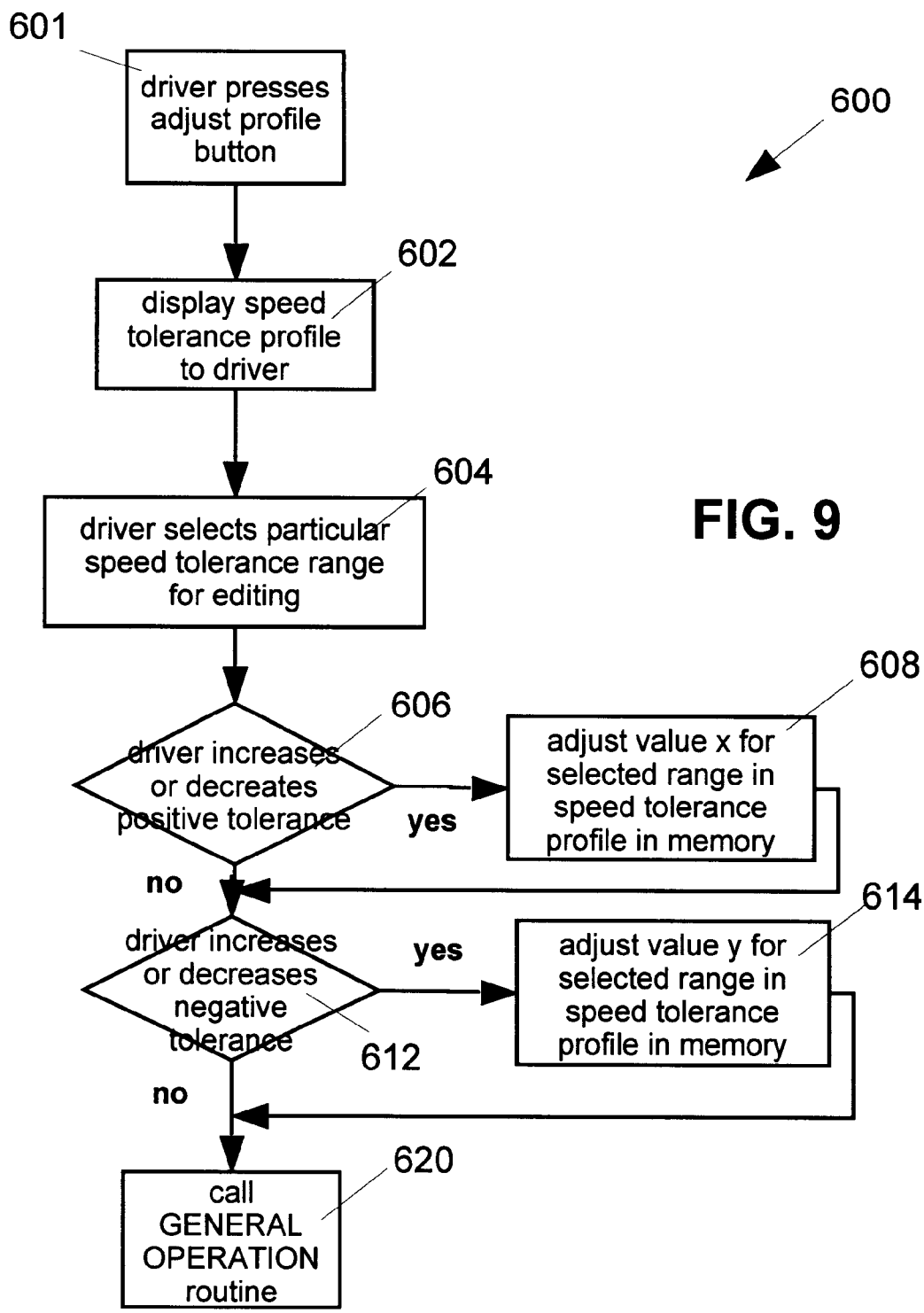
FIG. 9 is a flowchart showing the ADJUST PROFILE routine for the vehicle speed monitoring system of FIG. 1.

Referring now to FIGS. 1, 2 and 9, the ADJUST PROFILE routine 600 which is executed by controller 12 when driver 21 presses the adjust profile button 31 is illustrated specifically in FIG. 9. Using this routine, drivers can adjust his speed tolerance profile 28 at any time during operation of device 10. At step (601), driver 21 presses adjust profile button 31. At step (602) controller 12 instructs display driver 36 to instruct display 23 to display the speed tolerance profile 28. At step (604), driver 21 selects a specific speed tolerance range for editing and then depresses the appropriate UP (i.e. button 19a) or DOWN (i.e. button 19c) buttons to select and cause the positive or negative tolerances to be increased or decreased, as appropriate. It should be understood that in addition to UP and DOWN buttons (i.e. 19a and 19c), there will be other ways to adjust volume, to increase or decrease values in a speed tolerance profile, and to enter or delete marks when driving. The type of control mechanism could include what is known as "steering wheel controls" (i.e. controls within easy reach of the driver for device 10).

At step (606), controller 12 determines whether the user is increasing or decreasing the positive tolerance and if so then at step (608), controller 12 adjusts the value x for the selected range in speed tolerance profile 28 in ROM memory 34. If so or if no, then at step (612), controller 12 determines whether the user is increasing or decreasing the negative tolerance and if so then at step (614), controller 12 adjusts the value y for the selected range in speed tolerance profile 28 in ROM memory 34. Finally, if so or not, at step (620), the GENERAL OPERATION routine 200 is called.

Figure 10:
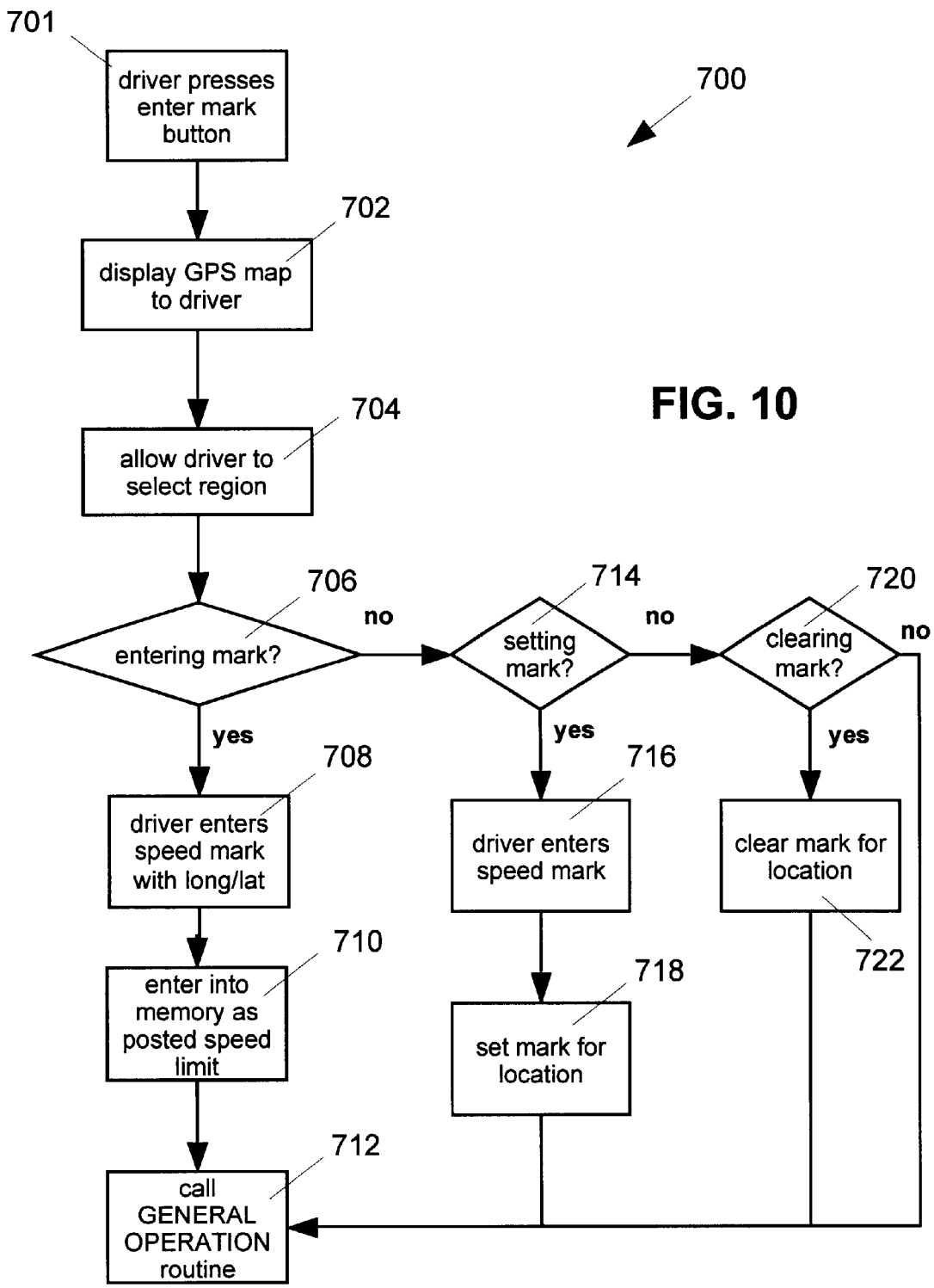
FIG. 10 is a flowchart showing the ENTER MARKS routine for the vehicle speed monitoring system of FIG. 1.

Referring now to FIGS. 1, 2 and 10, the ENTER MARKS routine 700 which is executed by controller 12 when driver 21 presses the enter mark button 33 is illustrated specifically in FIG. 10. Using this routine, driver 21 may enter personal speed limit marks (i.e. in place of posted speed limits) on a GPS map stored in ROM 34. It should be understood that there are two ways for driver 21 to enter marks into device 10. Specifically, driver 21 can enter the latitude/longitude coordinates manually or driver 21 can press the ENTER MARK button 33 when the vehicle is at the desired location, in accordance with conventional GPS practice.

Specifically, at step (702), driver 21 depresses the ENTER MARK button 33. At step (702), driver 21 displays GPS map 24 to driver 21 in screen area 3 as discussed above (and as shown in FIG. 2). At step (704), driver 21 is allowed to select region in which he/she wishes to put a speed limit mark. At step (706) controller 12 determines whether driver is entering mark (i.e. by querying and polling keyboard 20). If so, then driver enters speed mark with longitude and latitude values at step (708) which is then entered into ROM memory 34 as posted speed limit at step (710) and the GENERAL OPERATION routine 200 is called.

If not, then at step (714), controller 12 determines (i.e. by querying and polling keyboard 20) whether driver is setting mark. If so, then at step (716), driver enters speed mark and at step (718) the mark is stored in ROM memory 34 for the location of the vehicle as measured by GPS receiver 14 and GENERAL OPERATION routine 200 is called.

If not, then at step (720), controller 12 determines (i.e. by querying and polling keyboard 20) whether driver is clearing mark. If so, then at step (722) the personal speed limit mark is removed from ROM memory 34 for the location of the vehicle as measured by GPS receiver 14 (i.e. the mark is then replaced by the default posted speed limit) and GENERAL OPERATION routine 200 is called.

Although the present invention has been discussed in "stand alone" terms (i.e. implemented in its own proprietary microprocessor), it should be understood that it could also be incorporated into anyone of commercially available telematic units, such as Onstar manufactured by General Motors, and Clarion manufactured by Clarion/Nissan. Further, although the present invention has been discussed in association with a motor vehicle, it should be understood that any kind of vehicle could be fashioned with speed monitoring device 10. Specifically, speed monitoring device 10 could be implemented within any type of vehicle including a boat, a plane or any other type of moving vehicle as long as appropriate GPS maps are available for use.

Accordingly, the present invention makes a significant contribution to the art by preventing a driver from unknowingly or inadvertently operating vehicle outside of a certain personal speed range for safety or other reasons. Using a driver's own speed tolerance profile, speed monitoring device 10 enables the driver to concentrate on the challenges of driving, rather than being distracted by constantly monitoring or watching over the speed of the vehicle. Driver 21 may be motivated by a desire or need to remain within a particular speed range (e.g. ±10 km/hr) for a particular posted speed limit (e.g. 40 km/hr). Speed monitoring device 10 alerts the driver that it is not safe, or lawful, to operate his or her vehicle in excess of a certain speed limit and accordingly provide drivers with valuable peace-of-mind.

As will be apparent to persons skilled in the art, various modifications and adaptations of the structure described above are possible without departure from the present invention, the scope of which is defined in the appended claims.

We claim:

1. A device for monitoring the speed of a vehicle driven by a driver in relation to a posted speed limit, said device comprising:

(a) a GPS receiver for determining the location and speed of the vehicle;

(b) an input device adapted to allow the driver to input a speed tolerance profile which includes a driver selected tolerance range for the posted speed limit;

(c) a memory coupled to said GPS receiver and said input device for storing said speed tolerance profile;

(d) a processor coupled to said GPS receiver, said input device, and said memory, for determining the posted speed limit, for comparing the speed of the vehicle with the posted speed limit, calculating the difference in speed between the speed of the vehicle and the posted speed limit, and generating a warning when said difference in speed exceeds the driver selected tolerance range for the posted speed limit.

2. The device of claim 1 further comprising a display coupled to the processor to display flashing text when said difference in speed exceeds the driver selected tolerance range for the posted speed limit.

3. The device of claim 1, further comprising a speech synthesizer for providing a spoken audible warning when said difference in speed exceeds the driver selected tolerance range for the posted speed limit.

4. The device of claim 1, further comprising a buzzer for providing a buzzer warning when said difference in speed exceeds the driver selected tolerance range for the posted speed limit.

5. The device of claim 1, wherein said processor is adapted to store a GPS map, said posted speed limit being determined from said GPS map in conjunction with the location of the vehicle.

6. The device of claim 5, wherein said GPS map has a plurality of posted speed limit zones and said processor generates a warning when the location and direction of the vehicle as determined by the GPS receiver in conjunction with said GPS map indicates that the vehicle is about to enter a different posted speed limit zone.

7. The combination of the device of claim 1 and a cruise control system for a vehicle, the cruise control system being operable at a selected cruise control speed, said cruise control system being interruptible to become inactive when the vehicle undergoes braking, and said warning system being operable at a selected warning speed higher than the cruise control speed.

8. The device of claim 1, further comprising a cellular modem for transmitting an alerting signal when said difference in speed exceeds the driver selected tolerance range for the posted speed limit a predetermined number of times.

9. The device of claim 1, further comprising a cellular modem for transmitting an alerting signal to a designated remote location when said difference in speed exceeds the driver selected tolerance range for the posted speed limit.

10. The device of claim 1, further comprising a cellular modem for providing a wireless data link for providing map related data.

11. A method for monitoring the speed of a vehicle in relation to a posted speed limit, said method comprising:
   (a) determining the location and speed of the vehicle;
   (b) allowing the driver to input a speed tolerance profile which includes a driver selected tolerance range for the posted speed limit;
   (c) storing the speed tolerance profile;
   (d) determining the posted speed limit;
   (e) comparing the speed of the vehicle with the posted speed limit and calculating the difference in speed between the speed of the vehicle and the posted speed limit; and
   (f) generating a warning when said difference in speed exceeds the driver selected tolerance range for the posted speed limit.

12. The method of claim 11, where step (e) includes the displaying of flashing digits when said difference in speed exceeds the driver selected tolerance range for the posted speed limit.

13. The method of claim 11, where step (e) includes the provision of a spoken audible warning when said difference in speed exceeds the driver selected tolerance range for the posted speed limit.

14. The method of claim 11, where step (e) includes the provision of a buzzer sound when said difference in speed exceeds the driver selected tolerance range for the posted speed limit.

15. The method of claim 11, wherein step (c) comprises determining the posted speed limit from a GPS map in conjunction with the location of the vehicle.

16. The method of claim 11, further comprising the step of generating a warning when the location and direction of the vehicle indicates that the vehicle is about to enter a different posted speed limit zone.

17. The method of claim 11, further comprising transmitting an alerting signal when said difference in speed exceeds the driver selected tolerance range for the posted speed limit predetermined number of times.

* * * * *

UNITED STATES PATENT AND TRADEMARK OFFICE
CERTIFICATE OF CORRECTION

PATENT NO.        : 6,728,605 B2
APPLICATION NO.   : 10/145805
DATED             : April 27, 2004
INVENTOR(S)       : David M. C. Lash and Anthony B. Lash It is certified that error appears in the above-identified patent and that said Letters Patent is hereby corrected as shown below:

Title page, item (73), the name of the assignee "Beacon Marine Security Limited" should read --Beacon Wireless Solutions Inc.--, so that the item (73) reads --Assignee: Beacon Wireless Solutions Inc., Toronto (CA)--.

Signed and Sealed this
Sixteenth Day of September, 2014

Michelle K. Lee
*Deputy Director of the United States Patent and Trademark Office*